(12) United States Patent
Lovmark

(10) Patent No.: US 10,064,329 B1
(45) Date of Patent: Sep. 4, 2018

(54) TRIMMER HEAD WITH ANTI-FOULING MECHANISM

(76) Inventor: August Otto Lovmark, Sebastopol, CA (US)

(*) Notice: Subject to any disclaimer, the term of this patent is extended or adjusted under 35 U.S.C. 154(b) by 0 days.

(21) Appl. No.: 13/426,545

(22) Filed: Mar. 21, 2012

Related U.S. Application Data

(60) Provisional application No. 61/475,364, filed on Apr. 14, 2011.

(51) Int. Cl.
*A01D 34/416* (2006.01)
*A01G 3/06* (2006.01)

(52) U.S. Cl.
CPC ....... *A01D 34/4167* (2013.01); *A01D 34/416* (2013.01); *A01G 3/062* (2013.01)

(58) Field of Classification Search
CPC .............. A01D 34/416–34/4168; A01G 3/062
USPC ................. 30/347, 276; 56/295, 12.7; 172/8
See application file for complete search history.

(56) References Cited

U.S. PATENT DOCUMENTS

| | | | | |
|---|---|---|---|---|
| 2,888,993 A * | 6/1959 | Dunning | | 172/15 |
| 3,900,071 A * | 8/1975 | Crawford | | 172/15 |
| 4,054,992 A * | 10/1977 | Ballas | | A01D 34/4168 30/276 |
| 4,062,114 A * | 12/1977 | Luick | | A01D 34/4168 30/276 |
| 4,065,913 A * | 1/1978 | Fisher | | A01D 34/4166 56/12.7 |
| 4,068,376 A * | 1/1978 | Briar | | 30/276 |
| 4,086,700 A * | 5/1978 | Inada | | A01D 34/4168 30/276 |
| 4,118,865 A * | 10/1978 | Jacyno et al. | | 30/276 |
| 4,190,954 A * | 3/1980 | Walto | | 30/347 |
| 4,426,780 A * | 1/1984 | Foster | | A01D 34/4162 30/276 |
| 4,630,371 A * | 12/1986 | Graham | | 30/347 |
| 5,213,913 A * | 5/1993 | Anthony, III | | B25F 5/02 292/244 |
| 5,414,934 A * | 5/1995 | Schlessmann | | 30/275.4 |
| 5,615,543 A * | 4/1997 | Caffey et al. | | 56/295 |
| 5,649,413 A * | 7/1997 | Oostendorp | | 56/12.7 |
| 5,887,489 A * | 3/1999 | Zerrer | | 74/527 |
| 6,108,914 A * | 8/2000 | Sheldon | | 30/276 |
| 6,176,015 B1 * | 1/2001 | Morabit et al. | | 30/276 |
| 6,750,016 B2 * | 6/2004 | Mirkin et al. | | 435/6.12 |
| D496,840 S * | 10/2004 | Iacona | | D8/8 |

(Continued)

*Primary Examiner* — Laura M Lee
(74) *Attorney, Agent, or Firm* — Gary Hoenig

(57) ABSTRACT

A grass and weed trimmer head is provided having a trimmer head body wherein the outside surface has a dome-like contour with the drive shaft of the trimmer centrally fixed to the top of the dome. The bottom of the body is a circular opening having an inside diameter large enough to accommodate the outside diameter of a rotatable bottom plate so as to allow sufficient clearance to permit free rotation of the bottom plate while providing insufficient clearance for debris to enter the clearance. The rotatable bottom plate is disposed in a manner so as to redirect cutting debris away from the crevasses in the trimmer. The dome-like contour encourages the redirection of the cutting debris outwards and away from the central shaft thereby significantly reducing the propensity of wrapping and clumping around the central shaft. Easy removal of the cutting strings aids disentanglement of cuttings from the trimmer.

18 Claims, 5 Drawing Sheets

(56) References Cited

U.S. PATENT DOCUMENTS

| | | | |
|---|---|---|---|
| 7,008,684 B2 * | 3/2006 | Haataja | B29C 43/40 144/196 |
| 7,111,404 B2 * | 9/2006 | Hanes et al. | 30/276 |
| 2007/0180705 A1 * | 8/2007 | Chiu | 30/276 |

* cited by examiner

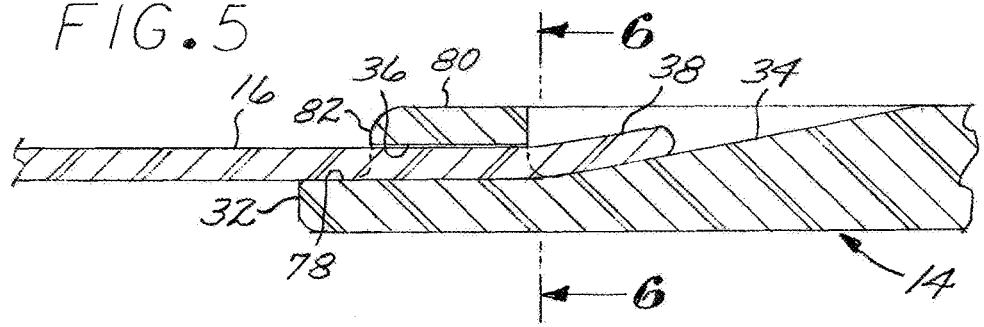
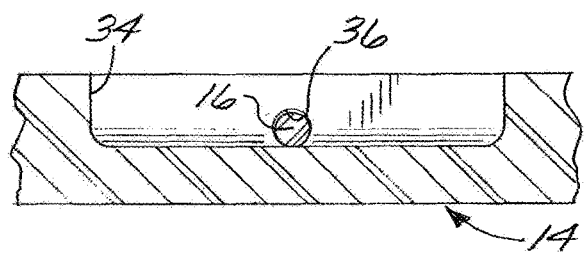
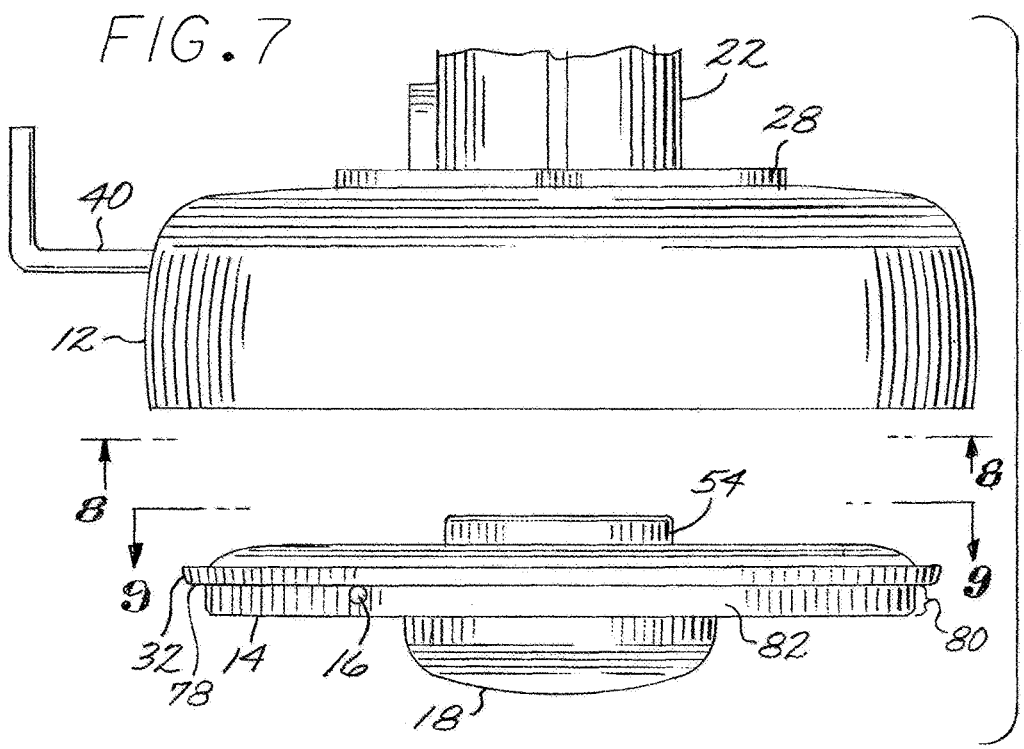

fouling and jamming from plant stems wrapping around the apparatus.

TRIMMER HEAD WITH ANTI-FOULING MECHANISM

FIELD OF THE INVENTION

The invention relates to grass and weed trimming devices; and, more particularly to a new type of trimmer head having features facilitating use with minimal fouling and jamming from plant stems wrapping around the apparatus.

BACKGROUND OF THE INVENTION

The use of conventional trimmers is well known for cutting grass and weeds. The trimmers commonly comprise a handle, shaft and head assembly wherein the shaft has a centrally disposed motor driven rotating drive element arranged to rotate a trimmer head having cutting strings. The high speed rotation of the trimmer head provides sufficient momentum in the cutting strings to severe standing grass and weeds. Trimmers are known to periodically jam or foul in circumstances where the plant material is tall and/or wet and the cuttings tend to wrap around the shaft above the trimmer head interfering with the rotation of the rotatable portion of the trimmer head. Similarly, cuttings tend to obstruct the rotatable portion of the trimmer head by jamming either around the head or between the outer circumference of the rotatable portion of the trimmer head and portions of the trimmer head that are stationary and fixed to the shaft; thereby necessitating the disassembly of the trimmer head to remove the offending debris.

Consequently, there exists a need for an improved trimmer head that provides an anti-fouling mechanism to reduce the propensity of cuttings from jamming the trimmer head thereby avoiding the disadvantages of the prior art. The present invention fulfills this need, and further provides related advantages.

SUMMARY OF THE INVENTION

Accordingly, the present invention is directed to a grass and weed trimmer head providing anti-fouling mechanisms and features arranged and disposed so as to reduce occurrences of cutting debris related jamming and thus stalling of the rotatable portion of the trimmer head.

The present invention is a trimmer head having a trimmer head body wherein the outside surface has a dome-like contour with the housing of a provided trimmer drive shaft centrally fixed to the top of the dome. The trimmer head body is therefore stationary in contrast to the typical prior art wherein the entire trimmer head rotates. The stationary trimmer head body feature significantly reduces debris entanglement thereby providing advantages over the prior art. The bottom portion of the dome of the trimmer head body is open forming a circular opening having an inside diameter large enough to accommodate the outside diameter of a rotatable bottom plate so as to allow sufficient clearance to permit free rotation of the bottom plate whilst providing insufficient clearance for debris to enter the clearance. The rotatable bottom plate is centrally and coaxially fixed to the rotatable portion or rotating shaft of the provided trimmer drive shaft, and is disposed within the trimmer head body bottom portion such that the bottom of the rotatable bottom plate is flush or recessed relative to the bottom of the trimmer head body thereby redirecting debris away from the clearance between the trimmer head body and the bottom rotation plate. Similarly, as the trimmer head body is stationary relative to the rotatable portion of the trimmer drive shaft and as the trimmer head body outside contour is dome-like the features of the present invention encourage the redirection of the tops of long shafts of the cuttings outwards and away from the central shaft thereby significantly reducing the propensity of the cutting tops from wrapping and clumping around the trimmer head and trimmer central shaft. Preventing the entanglement of the cutting tops further reduces the chances of interfering with the rotation of the bottom rotatable plate of the trimmer head. The trimmer head according to the present invention is suitable for use in combination with both straight and angle mounted drive shaft arrangements. Alternate optional mounting mechanisms are further provided facilitating universal retrofit to a wide range of drive shaft designs for retrofit and repair applications.

A further feature directed to anti-fouling according to the present invention readily removable cutting strings so disposed as to allow the user to retract the cutting strings back from outer edge of the rotatable bottom plate so as to easily release debris in circumstances where cutting debris becomes entangled around the cutting strings thereby providing advantages over conventional trimmer heads having continuous feed cutting strings fed from internally disposed spools. The retractable cutting string feature of the present invention further provides a means to present multiple cutting strings along the outer edge of the bottom rotatable plate of the trimmer head. The number of cutting strings used in the trimmer head is therefore configurable. The details of the trimmer head, providing anti-fouling and ease of use features and elements accomplishing the objectives of the present invention, are now disclosed.

BRIEF DESCRIPTION OF THE DRAWINGS

The accompanying drawings, which are incorporated in and constitute a part of this specification illustrate embodiments of the invention and, together with the description, serve to explain the features, advantages, and principles of the invention.

In the drawings:

FIG. 1 is a left side elevation view of the trimmer head attached to a typical trimmer drive shaft showing the curvature of the vertical circumference of the head constructed in accordance with the present invention to be dome-like.

FIG. 5 is a cross section view taken along Line 5-5 of FIG. 3, of the present invention, showing the proximate end of the cutting string received by the string receptacle of the rotatable bottom plate.

FIG. 6 is a cross section view taken along Line 6-6 of FIG. 5 illustrating the guide hole wherein an expansion of the proximate end of the cutting string is larger than the diameter of the guide hole.

FIG. 7 is similar to FIG. 4 showing an exploded view of the trimmer head wherein the spatial relationship of the various elements of the trimmer head is illustrated. Of particular noteworthiness is the relationship between the outer circumference of the rotatable bottom plate and the inside circumference of the bottom of the trimmer body.

DETAILED DESCRIPTION OF THE INVENTION

Figure 1:
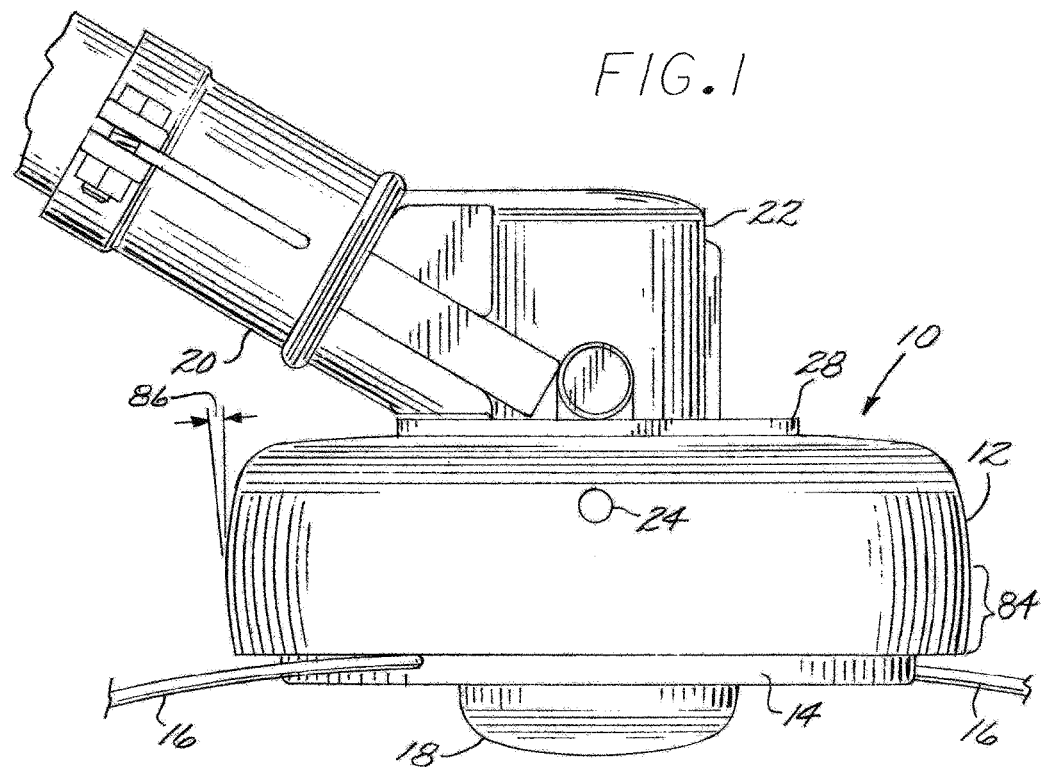

Although particular embodiments of the invention have been described in detail for purposes of illustration, various modifications may be made without departing from the spirit and scope of the invention. Accordingly, the invention is not to be limited except as by the appended claims. Referring now in greater detail to the various figures of the drawings wherein like reference characters refer to like parts, there is shown at 10 in FIG. 1, an embodiment of an improved grass and weed trimmer head having elements providing a means to minimize the propensity of long stemmed grass and weeds from wrapping around a trimmer shaft above the trimmer head and from fouling the rotatable bottom plate securing cutting strings when constructed in accordance with the subject invention. It will be appreciated that while the apparatus is particularly well suited for use as a grass and weed trimmer, the apparatus may also be used in other similar applications.

Figure 2:
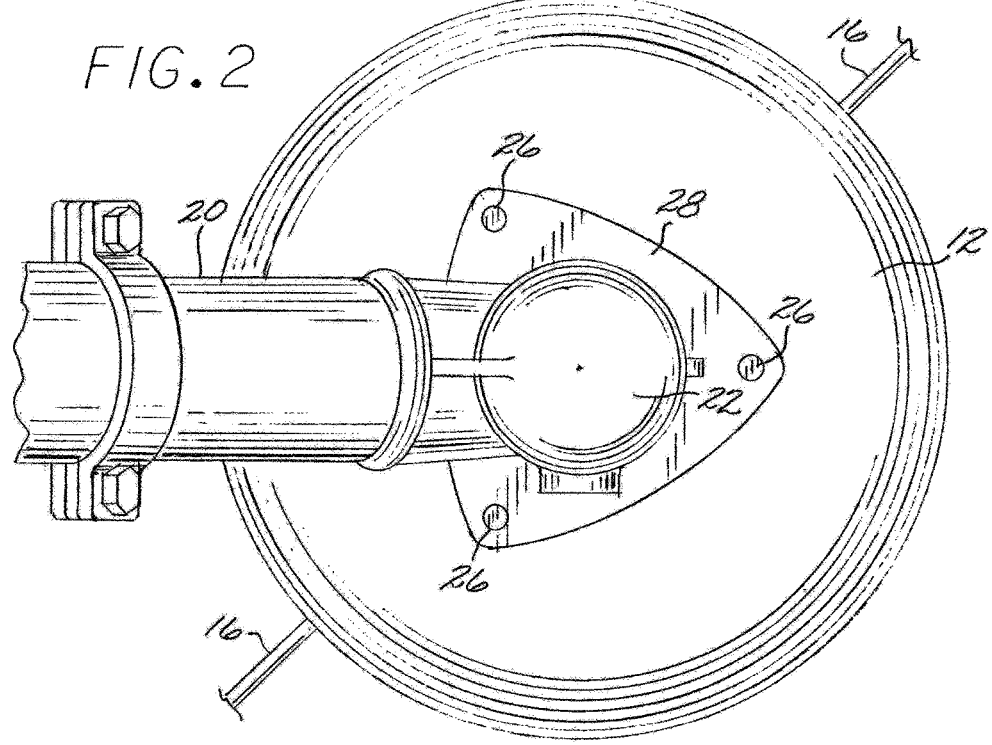
FIG. 2 is a top plan view of the trimmer head showing the bolt fasteners in place securing the head to the typical drive shaft housing.

Referring to FIG. 1, the left side elevation of the trimmer head 10 according to the present invention, and FIG. 2, a top plan view, the trimmer head is illustrated fixed to the housing of a typical drive shaft of a trimmer having an angle gear transfer housing 22. The trimmer head 10 is fastened to the bottom of the housing mounting plate that forms the bottom of a typical transfer housing 22. The trimmer head 10 of the present invention, comprises a trimmer body 12 having a dome-like outer contour, the body having a circular opening in the bottom, a rotatable bottom plate 14 being centrally mounted to the rotatable portion of a provided trimmer drive shaft and within the circular opening in the bottom of the trimmer body 12 wherein the diameter of the circular opening in the bottom of the trimmer body 12 is large enough to accommodate the outside diameter of a rotatable bottom plate 14 so as to allow sufficient clearance to permit free rotation of the bottom plate 14 whilst providing insufficient clearance for debris to enter the clearance, and at least one cutting string 16 disposed along the outer circumference of the rotatable bottom plate 14 and extending outwards beyond the trimmer body 12 to effectuate cutting of grass and weeds as the rotatable bottom plate 14 spins. The rotatable bottom plate 14 may optionally further comprise a ground clearance spacer 18 being a dome shaped expansion centrally disposed on the bottom of the rotatable bottom plate 14 and the height of the spacer so arranged to provide a minimum clearance between the ground and the cutting strings 16.

The outside surface of the trimmer body has a contour similar to a dome wherein the dome has a top, a bottom, a bottom circumference, a vertical portion, and a height together so disposed as to minimize cutting debris entanglement. The vertical portion being the bottom portion of the body has an outer cylindrical shape being at least 2 inches in height. An inwardly contoured bottom portion of the body, as shown in the figures has been found to enhance the anti-fouling features of the invention; however, a draft of 2 degrees, as required in the typically polymer mold has been found to be sufficient to gain the advantage. The top portion of the body beginning at the top of the vertical portion curves inward toward the center such that the central top of the dome portion is horizontal and flat providing an area sufficient to receive fittings from the housing of the drive shaft. The distance between the top of the vertical portion and the top of the dome portion is at least 2 inches. The vertical portion may have any height greater than 2 inches. Similarly the dome portion may have any height greater than 2 inches; however, in practice, design constraints will ultimately mandate maximum heights of both the vertical and dome portions.

Figure 3:
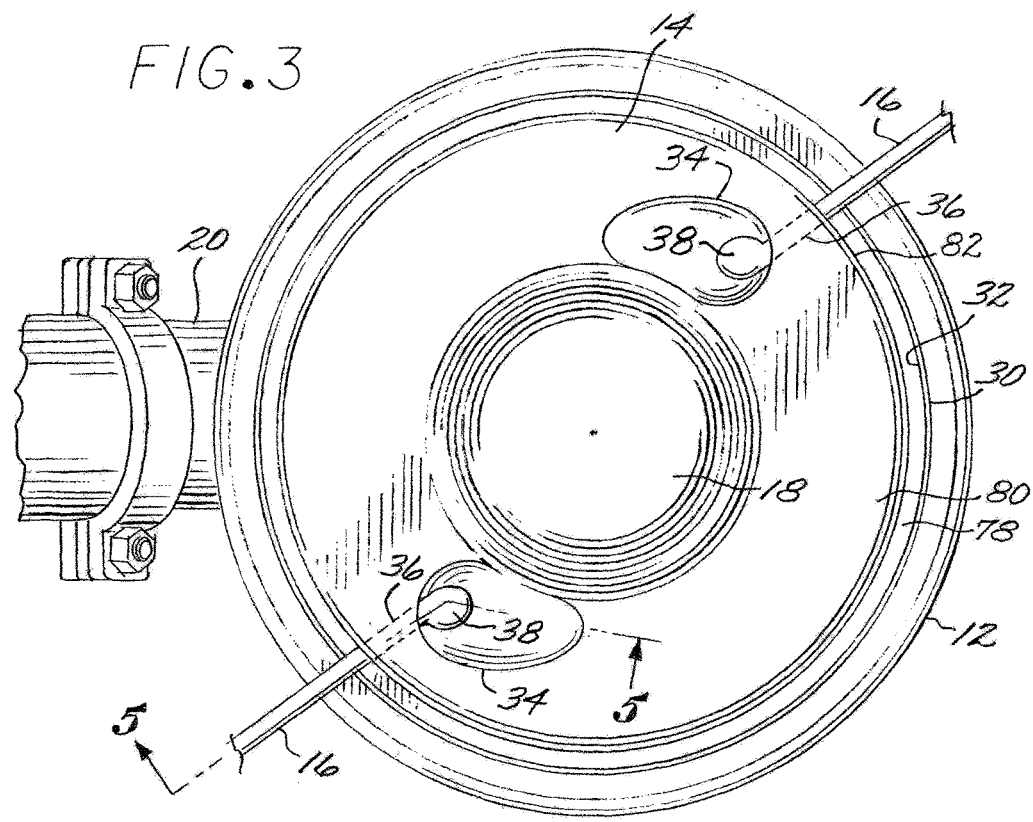
FIG. 3 is a bottom plan view of the trimmer head wherein the cutting strings are illustrated fixed within string receptacles formed in the bottom rotatable plate of the head.

The close spacing tolerance between the inside circumference 30 of the trimmer body 12 and the outer circumference 32 of the rotatable bottom plate 14 is illustrated in FIG. 3 at 30 and 32 wherein FIG. 3 is a bottom plan view of the trimmer head. The outer circumference bottom surface 78 is shown positioned flush with the bottom of the trimmer body. Also visible in FIGS. 3 and 7 are details of the cutting string retention recesses 34 in the bottom of the downward extension 80, being the bottom surface of the rotatable bottom plate 14, arranged so as to have a surface to perpendicularly receive the cutting string feed through guide 36 comprising a straight bore parallel to the bottom surface of the rotatable bottom plate 14 and outwardly towards and through the recessed circumference surface 82 of the downward extension 80 of the rotatable bottom plate 14. The embodiment depicted indicates the cutting string feed through guide 36 penetrating a recessed circumference surface 82 so as to further reduce capture of debris between the cutting strings 16 and the trimmer body 12.

Figure 4:
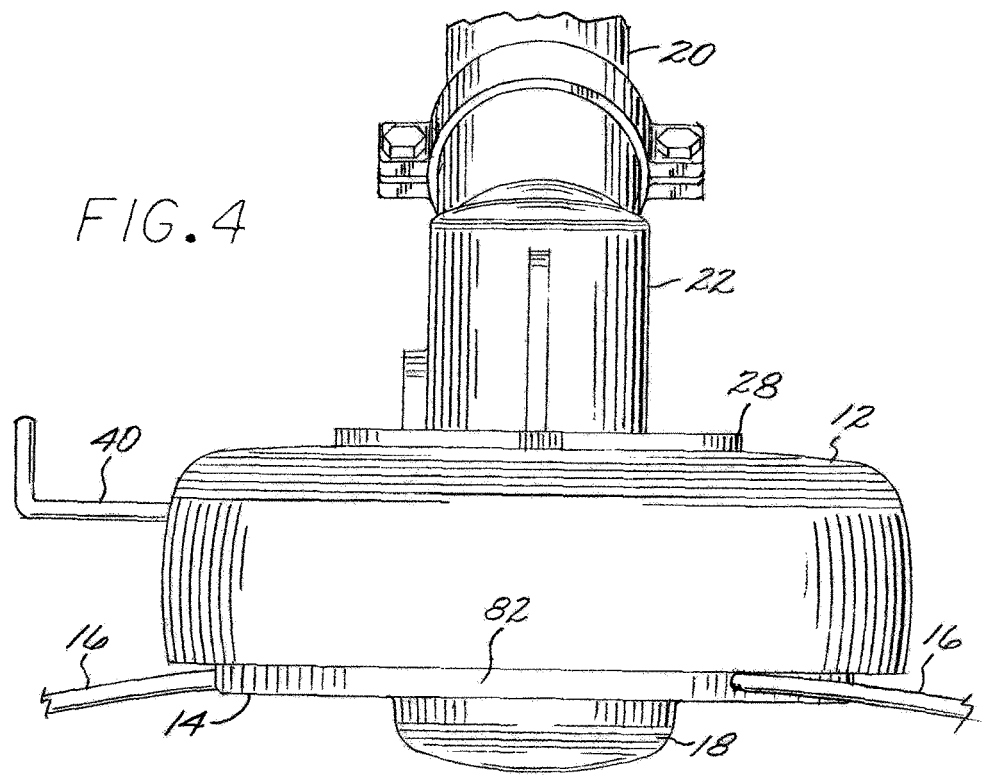
FIG. 4 is a front side elevation view of the trimmer head wherein the shaft locking tool has been inserted in the left side of the trimmer head for preventing the rotation of the central drive shaft thereby allowing the user to thread the rotatable bottom plate onto the reverse threaded rotatable portion of the drive shaft.

Referring to FIG. 4, a front elevation view of the trimmer head mounted to a user provided drive shaft, the shaft locking tool is illustrated having been inserted through the trimmer body 12. The shaft locking tool 40, when inserted, prevents the rotatable portion of the drive shaft from turning relative to the trimmer body 12 thus permitting the trimmer rotatable bottom plate 14 to be threaded onto the end of the rotatable portion of the drive shaft. The rotatable bottom plate 14 is disposed within the trimmer body 12 to a sufficient depth such that the cutting strings do not interfere with the bottom of the trimmer body 12 so as to allow free rotation. The height of the ground clearance expansion 18 on the bottom of the assembly in addition to defining the minimum height of grass to be permitted, also reduces the risk of the outer circumferences 32 and 60 from contacting the ground resulting in the loss of position control by an operator.

Details of the cutting strings 16 and the mounting elements are disclosed in FIG. 3, a bottom plan view of the trimmer head 10, FIG. 5, a cross sectional view taken along Line 5-5 of FIG. 3, and FIG. 6, a cross sectional view taken along Line 6-6 of FIG. 5. The cutting strings 16 are similar to known trimmer cutting strings being constructed of a polymer material, and having similar features and dimensions excepting an expansion 38 forming the proximate end of the cutting string. The expansion 38 has larger dimensions that the cutting string feed through 36 diameter thereby retaining the cutting string 16 in the rotatable bottom plate 14 during use of the trimmer. The cutting string 16 is readily removed by grasping the expansion 38 and pulling the cutting string 16 thereby retracting the cutting string 16 from the rotatable bottom plate 14, a feature facilitating easy removal of cutting debris entangled in the cutting strings. The cutting string recesses 34 have a depth of, at least, the diameter of the cutting string 16 such that the expansion 38 on the proximate end of the cutting string does not protrude below the bottom surface of the rotatable bottom plate 14 to yet further reduce risk of entanglement.

An exploded side elevation view of the trimmer head according to the presenting invention is provided in FIG. 7. The rotatable bottom plate 14 mounting pedestal 54 extends above the top of the rotatable bottom plate 14 and is centrally and symmetrically disposed and dimensioned to receive the threaded end of the rotatable portion of the drive shaft. Being mounted to the rotatable portion of the drive shaft, the plate 14 is positioned to spin within the trimmer body 12 with a close tolerance fit within the trimmer body 12 provided by outer circumference 32.

Figure 8:
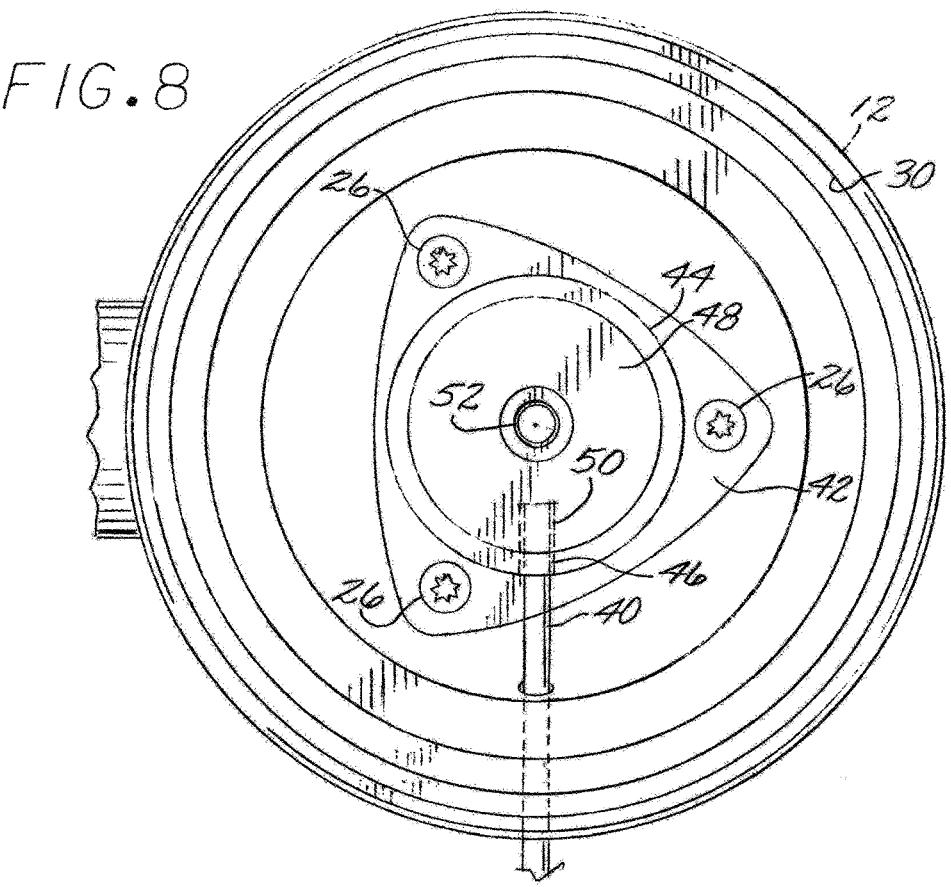
FIG. 8 is a cross section view of the trimmer body taken along Line 8-8 of FIG. 7 with the shaft locking tool inserted through the trimmer body, through the housing of the drive shaft and into an opening in the centrally disposed rotatable portion of the drive shaft for receiving the shaft locking tool to prevent secure the rotatable portion of the drive shaft to allow the threading of the rotatable bottom plate to the rotatable portion of the drive shaft.

Referring to FIG. 8, a plan view of the trimmer body 12 taken along Line 8-8 of FIG. 7, the mounting elements of the trimmer body 12 are illustrated. The inside surface of the trimmer body 12 is also substantially dome shaped to compliment the outside surface contour. The central portion of the body 12 is flat and has an opening to accommodate the insertion and mounting elements of the drive shaft. The trimmer head retention plate 42 is shown in position and secured to the angle gear transfer housing mounting plate 28 on the opposing side by trimmer head mounting fasteners 26. The drive shaft retention plate further comprises a cylindrical drive shaft collar 44 having a shaft locking tool accesses port 46 disposed to align with the shaft locking tool access port 24 located in the trimmer body 12. A drive shaft bearing 48 forms the end of the rotatable portion of the drive shaft and has a centrally disposed threaded fastener extending downwardly from the bushing for threading into the female threaded shaft fastener 56 within the pedestal 54 of the rotatable bottom plate 14. The drive shaft bearing 48 is cylindrically shaped having a diameter so as to fit inside while allowing rotation of the bearing within the collar 44 of the retention plate 42. The bearing has a shaft locking tool receiver 50 being a cylindrically shaped hole in the vertical side of the bearing disposed so as to align with the shaft locking tool access port 42 in the collar 44 of the retention plate 42. Manually turning the rotatable portion of the drive shaft to a position where the various shaft locking tool openings align permits the user to insert the tool to prevent the rotatable portion of the drive shaft from rotating thereby facilitating the threading of the rotatable bottom plate onto the drive shaft.

Figure 9:
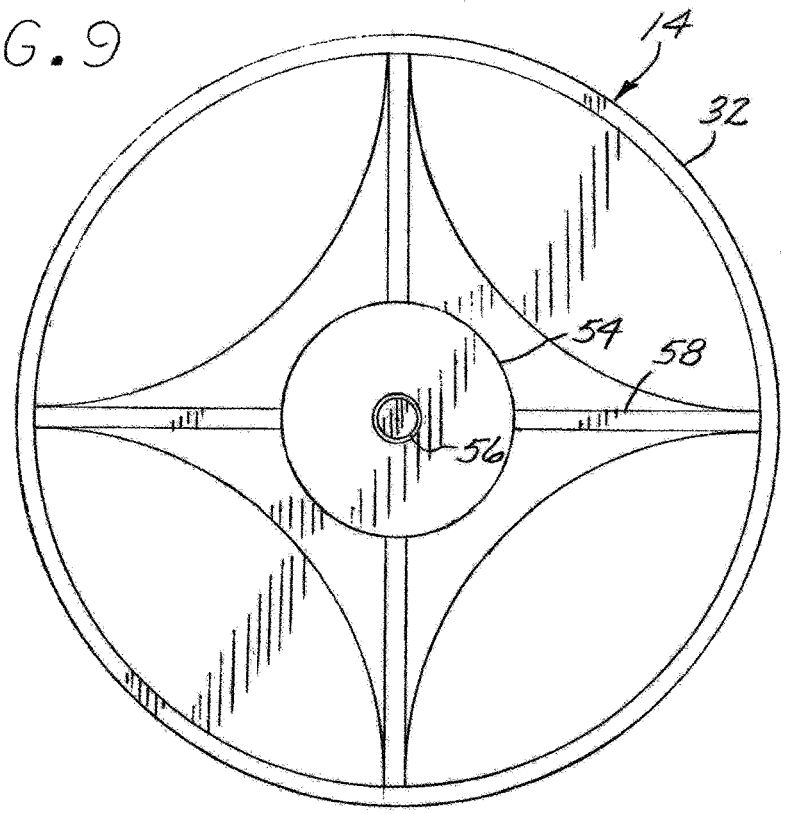
FIG. 9 is a top plan view of the rotatable bottom plate according to the present invention wherein gusseted reinforcement supports are molded into the plate so as to securely fix the central neck portion having a threaded female fastener disposed to receive the threaded end of the rotatable portion of the drive shaft.

Referring to FIG. 9, a top plan view of the rotatable bottom plate 14 taken along Line 9-9 of FIG. 7, the pedestal support gussets 58 are visible within a shallow recess in the top of the plate 14. Also illustrated is the female threaded drive shaft fastener disposed centrally within the pedestal 54.

Although the trimmer head body 12 and rotatable bottom plate 14, according to the present invention, may be constructed of any suitable material including metal and plastic; however, a polymer material is preferred thereby permitting the use of molds to manufacture these elements so as to reduce the manufacturing costs.

Figure 10:
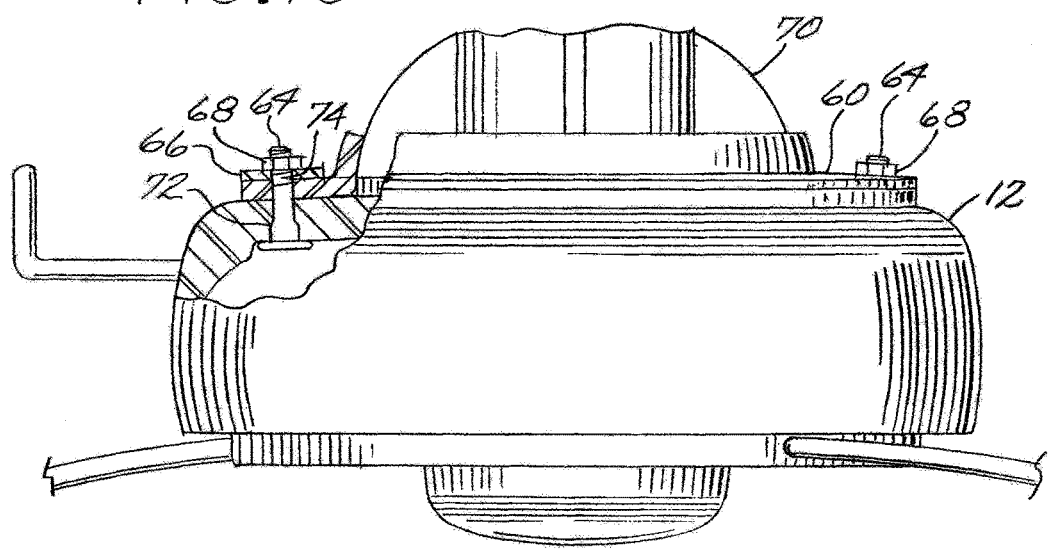
FIG. 10 is a left side elevation view of an alternate embodiment of the trimmer head according to the present invention with a sectional inset view of a mount fastener for a means for mounting shafts to the trimmer head wherein the means for mounting shafts is a drive shaft mounting ring.
Figure 11:
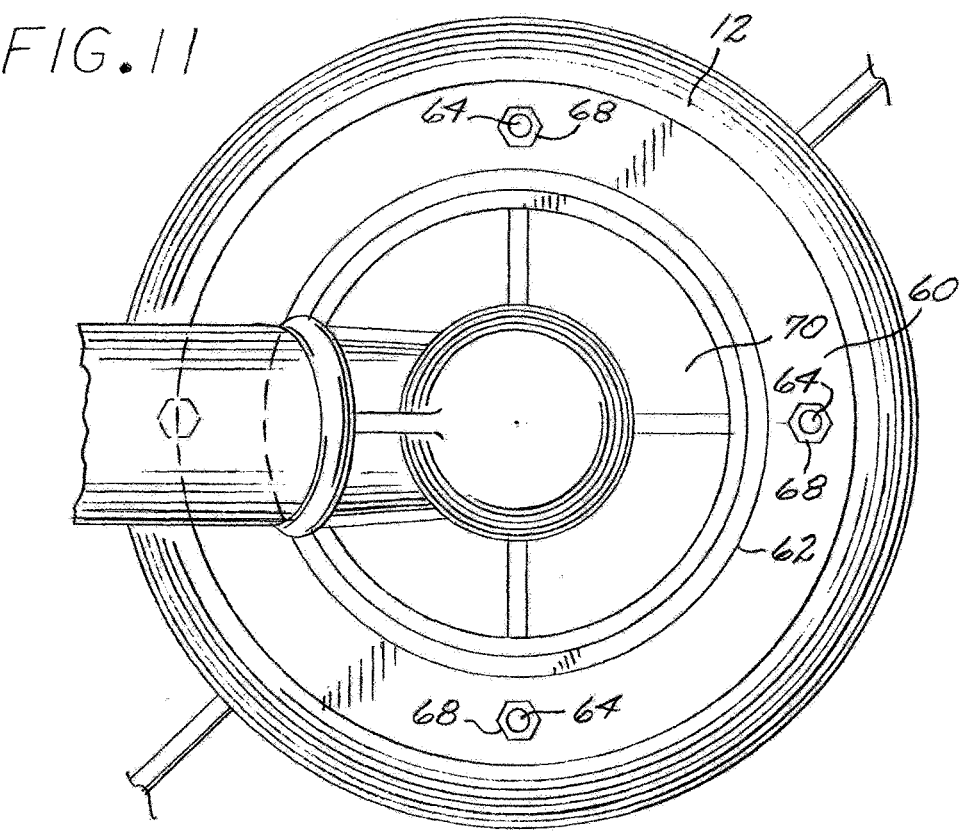
FIG. 11 is a top plan view of the alternate embodiment of the trimmer head of FIG. 10 illustrating the drive shaft mounting ring in position and secured to the trimmer head by the mount fasteners.

Referring to FIGS. 10 and 11, an alternate embodiment of the trimmer head is illustrated having an alternate means for mounting a user provided drive shaft to the trimmer head. The means for mounting a drive shaft illustrated is a drive shaft mounting ring 60 having a concentric tapered portion 62 extending upwards along the inner circumference of the ring 60 and proportioned and sized to grip a drive shaft when the ring 60 is affixed to the top of the trimmer head body 12 by threaded fasteners 64 inserted through the body 12 penetrations 72 aligning with borings 74 in the mounting ring 12 and secured by washers 66 and nuts 68. Alternate forms of the mounting ring may be used as required to accommodate various drive shaft designs.

In view of the foregoing, it will be appreciated that the several objects of the invention are achieved and other advantages are attained. Although the foregoing includes a description of the best mode contemplated for carrying out the invention, various modifications are conceivable.

I claim:

1. A grass and weed trimmer comprising
a motor driven trimmer drive shaft having a housing and a rotating drive element; and,
a trimmer head coupled to the motor driven drive shaft housing and rotating drive element, the trimmer head comprising,
a trimmer body being cylindrically shaped having a bottom portion, a top and a bottom and the top having a contoured outer dome shaped surface, the outer dome shaped surface and cylinder surface forming the exterior surface of the trimmer body, the bottom portion of the trimmer body having an inward contour, the bottom having a circular opening having an inside circumference, the top having an opening to removably receive a motor driven trimmer shaft having a housing and a rotatable portion with the trimmer body fixed to the housing of the motor driven trimmer drive shaft wherein the trimmer body remains stationary relative to the motor driven trimmer drive shaft housing,
a rotatable bottom plate having a bottom surface, an outer circumference, and being a circular disk shape concentrically and rotatably disposed within the circular opening in the bottom of the trimmer body with the bottom surface of the rotatable bottom plate being recessed within the bottom of the trimmer body, having a diameter providing a close tolerance fit between the outer circumference of the rotatable bottom plate and the inside circumference of the trimmer body, and a centrally disposed drive shaft fastener receiving the rotatable portion of the motor driven trimmer drive shaft, whereby the close tolerance fit facilitates debris exclusion from the interior of the trimmer body; and,
at least one cutting string disposed in a feed through guide, formed in a cylindrically shaped downward extension of the rotatable bottom plate bottom surface having a recessed circumference less than the circumference of the rotatable bottom plate and providing a bore from a string retention recess formed in the bottom of the rotatable bottom plate extension and directed towards the recessed circumference of the downward extension of the rotatable bottom plate with the proximate end of the cutting string being positioned within the string retention recess.

2. A grass and weed trimmer comprising a motor driven trimmer drive shaft having a housing and a rotating drive element; and, a trimmer head coupled to the motor driven drive shaft housing and rotating drive element, the trimmer head comprising, a trimmer body being cylindrically shaped, having a top, a bottom, longitudinal vertical sides, an inside and outer circumference, and having a contoured outer dome shaped surface top portion forming the top, the bottom having a circular opening defining the inside circumference, the top having an opening to receive the motor driven trimmer drive shaft, and the longitudinal sides and the contoured outer dome shaped surface top portion forming the exterior surface of the trimmer body, means for removably mounting the housing of the motor driven trimmer shaft to the top of the trimmer body, wherein the trimmer body is fixed to the housing and stationery relative to the drive rotating element, a rotatable bottom plate having a circular disk shape, a top and a bottom surface, an outer circumference, concentrically and rotatably disposed aligned with the trimmer body axis within the circular opening in the bottom of the trimmer body with the bottom surface being flush with the bottom of the trimmer body, and having a diameter providing a close tolerance fit between the outer circumference and the inside circumference of the trimmer body, a drive shaft fastener receiving and fixing the rotating drive element of the motor driven trimmer drive shaft to the rotatable bottom plate, the drive shaft fastener being concentrically and coaxially disposed on the top surface of the rotatable bottom plate wherein the rotatable bottom plate rotation is the same as the rotation of the rotating drive element, a rotatable bottom plate extension being cylindrically and disk shaped expansion of the bottom surface of the rotatable bottom plate, extending downwardly from the bottom surface of the rotatable bottom plate and centrally and concentrically disposed on the bottom surface of the rotatable bottom plate, the extension having a bottom, longitudinal vertical surface and an outer circumference, the outer circumference being recessed from the rotatable bottom plate outer circumference and having a diameter less than the rotatable bottom plate; and, at least one cutting string disposed in a feed through guide being a bore formed in the longitudinal vertical surface of the rotatable bottom plate extension, the bore extending from a string retention recess formed in the bottom of the rotatable bottom plate extension and directed towards and emerging through the outer circumference of the rotatable bottom plate extension with the proximate end of the cutting string being positioned within the string retention recess.

3. The grass and weed trimmer of claim 2 wherein the drive shaft fastener of the rotatable bottom plate comprises a centrally mounted pedestal having a threaded fastener.

4. The grass and weed trimmer of claim 3 wherein the threaded fastener is a female type fastener.

5. The grass and weed trimmer of claim 3 wherein the threaded fastener has a counterclockwise thread.

6. The grass and weed trimmer of claim 2 wherein the cutting string has an expansion at the proximate end.

7. The grass and weed trimmer of claim 6 wherein the feed through guide bore has dimensions smaller than the string proximate end expansion.

8. The grass and weed trimmer of claim 2 wherein the trimmer body has a contoured inner dome shaped surface.

9. The grass and weed trimmer of claim 8 wherein a central portion of the top of the trimmer body domed surface is flat.

10. The grass and weed trimmer of claim 2 further comprising a shaft locking tool access port in the outer circumference longitudinal vertical surface of the trimmer body.

11. The grass and weed trimmer of claim 2 wherein the trimmer body is constructed of metal.

12. The grass and weed trimmer of claim 2 wherein the trimmer body is constructed of plastic.

13. The grass and weed trimmer of claim 2 wherein the rotatable bottom plate and the rotatable bottom plate extension is constructed of metal.

14. The grass and weed trimmer of claim 2 wherein the rotatable bottom plate and the rotatable bottom plate extension is constructed of plastic.

15. The grass and weed trimmer of claim 2 wherein the means for mounting the housing of the motor driven trimmer drive shaft is a drive shaft mounting ring having an inner circumference and being removably fixed to the top of the trimmer head by fasteners and having a concentric tapered portion extending upwards along the inner circumference of the ring, the tapered portion being proportioned and sized to grip the housing of the motor driven trimmer drive shaft when the ring is affixed to the top of the trimmer body.

16. The grass and weed trimmer of claim 2 wherein the means for mounting the housing of the motor driven trimmer drive shaft is a trimmer head retention plate centrally disposed below the top of the trimmer body and secured with fasteners through the trimmer body to the housing of the motor driven trimmer drive shaft.

17. The grass and weed trimmer of claim 2 wherein the trimmer head body longitudinal vertical side has a bottom portion being inwardly contoured.

18. The grass and weed trimmer of claim 17 wherein the trimmer head body inwardly contoured bottom portion has a draft of at least two degrees.

* * * * *